(12) United States Patent
Mincher (10) Patent No.: US 8,832,339 B1
(45) Date of Patent: Sep. 9, 2014

(54) FULL-DUPLEX ASYNCHRONOUS COMMUNICATIONS USING SYNCHRONOUS INTERFACES

(71) Applicant: Amazon Technologies, Inc, Reno, NV (US)

(72) Inventor: Richard William Mincher, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/802,147

(22) Filed: Mar. 13, 2013

(51) Int. Cl.
*G06F 3/00* (2006.01)
*G06F 5/00* (2006.01)
*G06F 13/42* (2006.01)

(52) U.S. Cl.
CPC ..................................... *G06F 13/423* (2013.01)
USPC .................................. 710/61; 710/20; 710/36

(58) Field of Classification Search
None
See application file for complete search history.

(56) References Cited

U.S. PATENT DOCUMENTS 7,062,587 B2 * 6/2006 Zaidi et al. .................... 710/305
2008/0133800 A1 * 6/2008 Gloekler et al. ................ 710/61

* cited by examiner

*Primary Examiner* — Zachary K Huson
(74) *Attorney, Agent, or Firm* — Lindauer Law, PLLC (57) ABSTRACT

Synchronous interfaces on a first device are configured such that a first synchronous interface is set to a slave mode while a second synchronous interface is set to a master mode. A second device with two synchronous interfaces may then be coupled to the first device with the corresponding synchronous interfaces in master mode and slave mode, respectively. A pair of unidirectional synchronous data channels is established, allowing data transfer between the devices. These channels allow for asynchronous-like transmission of data, in that transmission and corresponding receipt of data may take place at irregular intervals.

20 Claims, 7 Drawing Sheets

FULL-DUPLEX ASYNCHRONOUS COMMUNICATIONS USING SYNCHRONOUS INTERFACES

BACKGROUND

A wide variety of devices and equipment ranging from electronic book readers ("e-readers"), tablet computers, smartphones, medical devices, and so forth, use various communication interfaces to exchange information with other devices. These other devices may include input/output ("I/O") devices, test equipment, and so forth. The communication interfaces may be asynchronous or synchronous.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Devices are deployed in applications ranging from e-readers to aircraft avionics. These devices may exchange information with other devices such as input/output ("I/O") devices, test equipment, and so forth. For example, one device may receive information from input devices such as keyboards, switches, temperature sensors, global positioning system receivers, and so forth. Continuing the example, the device may send information to output devices such as speakers, haptic output devices, graphic displays, lights, actuators, motors, and so forth. These devices may exchange information using synchronous or asynchronous communication interfaces.

Synchronous communication interfaces coordinate timing between devices. Synchronous communications impose limitations on when data can be transmitted. For example, a first device may be acting as a master and sending data while a second device is acting as a slave and receiving data. While in this configuration of master/slave, the slave is unable to send data unless the master is providing a clock. Some techniques are available to send information from the slave to the master, but these introduce complexity on the overall interface hardware as well as the supporting software.

In comparison, asynchronous communication interfaces do not require timing synchronization between the first and second devices. This may simplify the construction and operation of the interfaces. Asynchronous communication interfaces may be used when coupling to devices which send or receive data at varying intervals. For example, keyboards, switches on a device, light sensors, test equipment, and so forth, may generate output signals at any time.

Given the popularity of using asynchronous communication interfaces, devices may be equipped with several, allowing for concurrent connectivity with multiple devices. In some implementations, all of the available asynchronous communication interfaces may be allocated for use. Any additional asynchronous devices, such as a diagnostic or test system, may thus have no available asynchronous communication interface to attach to. However, synchronous communication interfaces may be available and otherwise unused.

Described in this disclosure are systems and methods for using a pair of synchronous communication interfaces to establish a pair of contemporaneous unidirectional synchronous data channels. One unidirectional synchronous data channel is configured to receive data in to a device, while another unidirectional synchronous data channel is configured to send data out from the device. Because each unidirectional synchronous data channel is established and available for sending data, information may be sent at irregular intervals between the devices.

Use of the synchronous communication interfaces may convey various advantages over asynchronous communications including, but not limited to one or more of availability for use, or increased data throughput. Some implementations using synchronous communication interfaces may also be more tolerant of disconnections, such that disconnection may not result in generation of error messages. As described above, in some implementations, a device such as a system-on-a-chip ("SoC") may have all asynchronous communication interfaces already allocated for use. Furthermore, synchronous communications feature lower overhead than asynchronous communications which may include control bits such as start and stop bits. This may result in increased data throughput.

Illustrative Systems

Figure 1:
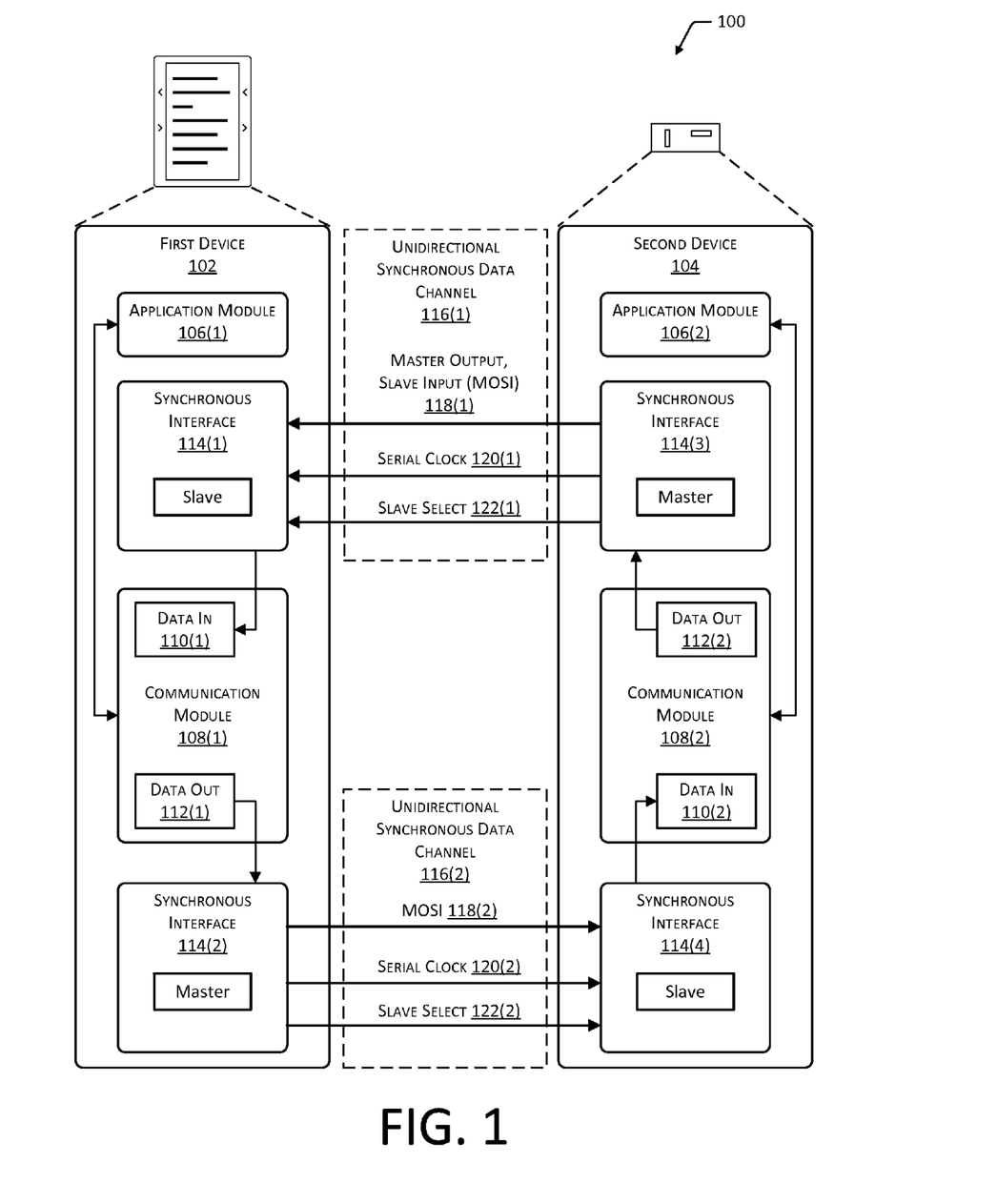
FIG. 1 is an illustrative system showing a first device and a second device coupled together for bidirectional communication using a pair of unidirectional synchronous data channels.

FIG. 1 is an illustrative system 100 using a pair of unidirectional synchronous data channels for communication. In this illustration, a first device 102 and a second device 104 are depicted. These devices 102 and 104 may include e-readers, tablet computers, smartphones, laptops, netbooks, desktop computers, servers, control systems, test equipment, sensor devices, and so forth. The second device 104 may be external to the first device 102. For example, they each may embody separate enclosures.

The first device 102 may include an application module 106(1), and the second device 104 may include an application module 106(2). These application modules 106(1), 106(2), . . . , 106(P) may be configured to provide various functions such as processing input, generating output, and so forth. For example, in one implementation, the application module 106(1) may include various instructions to perform diagnostic tests on the first device 102 when executed. Values in parenthesis such as "(P)" indicate an integer value.

The application modules 106 may couple to a communication module 108. The first device 102 may include a communication module 108(1) communicatively coupled to the application module 106(1). Likewise, the second device 104 may include a communication module 108(2) communicatively coupled to the application module 106(2). These modules may, but need not be, identical in structure or function.

The communication module 108 may process "data in" 110 which is information received by a particular device as well as "data out" 112 which is information being sent by the device. As illustrated here, the communication module 108(1) of the first device 102 receives data in 110(1) using a synchronous interface 114(1) which is configured in a slave mode and sends data out 112 using a synchronous interface 114(2) which is configured in a master mode. These synchronous interfaces 114(1) and 114(2) may be internal to the first device 102. The second device 104 includes a synchronous interface 114(3) and a synchronous interface 114(4). These synchronous interfaces 114(3) and 114(4) may be external to the first device 102 and internal to the second device 104.

As depicted here, each of the devices 102 and 104 may have two synchronous interfaces 114. These synchronous interfaces 114 may be configured to operate in a master mode or a slave mode. The master mode is configured to generate timing or clock signals, send data frames, and so forth. The corresponding slave mode is configured to receive the timing or clock signals and the data frames from another synchronous interface which is in the master mode. Each of the synchronous interfaces 114 may be configured to be in a master or a slave mode.

The synchronous interface 114(1) of the first device 102 is communicatively coupled to the synchronous interface 114(3) of the second device 104. This coupling may be electrical, optical, magnetic, and so forth. For example, in one implementation, wires may be used to connect the synchronous interfaces 114.

Two synchronous interfaces 114 which are communicatively coupled, such as with a cable, may be used to establish a unidirectional synchronous data channel 116. A unidirectional synchronous data channel 116 is configured to transfer data from one endpoint to another, but not back. For example, in this illustration, a first unidirectional synchronous data channel 116(1) is established between the synchronous interfaces 114(1) and 114(3) and configured to send data from the second device 104 to the first device 102. Similarly, a second unidirectional synchronous data channel 116(2) is configured to send data from the first device 102 to the second device 104.

The synchronous interfaces 114 may use different interface technologies and protocols for data transfer. However, the pairs of synchronous interfaces 114 are configured to use compatible or the same interface technologies. For example, the synchronous interfaces 114(1) and 114(3), which connect to one another, may both implement the serial peripheral interface ("SPI"), while the synchronous interfaces 114(2) and 114(4), which connect to one another, may use the inter-integrated circuit ("I2C") interface.

Illustrated here is an implementation where the synchronous interfaces 114 implement a portion of the SPI interface. In this implementation, three lines are used between each pair of synchronous interfaces 114. A master output, slave input ("MOSI") line 118 sends signals from the synchronous interface 114 acting as the master to the synchronous interface acting as the slave. In some implementations, multiple MOSI lines 118 may be provided to provide a "wide" mode, such as to increase throughput. A serial clock line 120 sends timing or clock signals from the master to the slave. A slave select line 122 sends a signal used to specify the synchronous interface 114 is to enter the slave or master mode, and may provide byte or word synchronization on the interface. In some implementations, the slave select line 122 may be optional. For example, where the slave select line 122 is omitted, synchronization may involve transmitting a known data pattern and adjusting the phase to align byte synchronization. As illustrated here, the lines 118(1), 120(1), and 122(1) are used to provide the unidirectional synchronous data channel 116(1) to receive data in 110(1) on the first device 102 from the second device 104. Similarly, the lines 118(2), 120(2), and 122(2) are used to provide the unidirectional synchronous data channel 116(2) to send data out 112(1) from the first device 102 to the second device 104.

By using the paired synchronous interfaces 114, bidirectional communication is established. Data may be sent between the first device 102 and the second device 104 without reconfiguring an interface. The communication module 108 is configured to route or direct data, such that the data out 112 is sent to the synchronous interface 114 which is a master. Similarly, data in 110 is passed from the communication module 108 to other devices or modules, such as the application module 106.

While this illustration depicts the synchronous interface 114(1) in the slave mode and the synchronous interface 114(2) in a master mode, in other implementations these modes may be swapped. For example, the synchronous interface 114(1) may be set to operate in the master mode while the synchronous interface 114(2) is set to operate in the slave mode. The corresponding synchronous interfaces 114(3) and 114(4) may have their modes swapped as well, to slave and master, respectively.

As also illustrated here, the synchronous interfaces 114 may be configured to have a single master and a single slave. In this configuration, each unidirectional synchronous data channel 116 connects one synchronous interface 114 configured as a master and one synchronous interface 114 configured as a slave.

Figure 2:
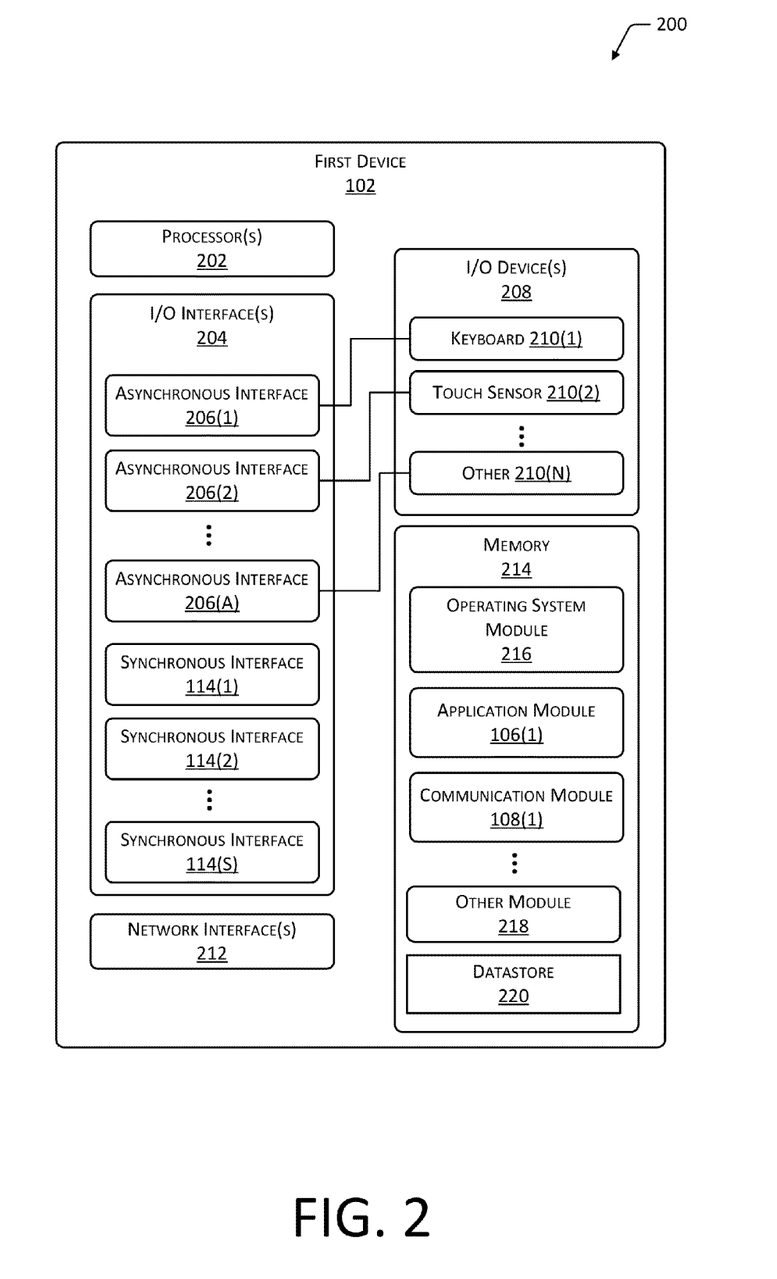
FIG. 2 is a block diagram of the first device configured to provide bidirectional communication using the pair of unidirectional synchronous data channels.

FIG. 2 is a block diagram 200 of the first device 102. As described above, the first device 102 is configured to provide bidirectional communication using the pair of unidirectional synchronous data channels 116. The first device 102 may include one or more processors 202 configured to execute one or more stored instructions. The processors 202 may comprise one or more cores. These may be general purpose cores, graphic processing unit cores, digital signal processing cores, and so forth.

The first device 102 may include one or more input/output ("I/O") interface(s) 204 to allow the first device 102 to communicate with other devices. The I/O interfaces 204 may comprise one or more asynchronous interfaces 206(1), 206(2), . . . , 206(A). For example, the asynchronous interfaces 206 may implement external memory interface ("EMIF"), RS-232 in asynchronous mode, and so forth.

The I/O interfaces 204 of the first device 102 may also include synchronous interfaces 114(1), 114(2), . . . , 114(S). As described above, these synchronous interfaces may implement SPI, I2C, and so forth.

The I/O interface(s) 204 may couple the one or more processors 202 to one or more I/O devices 208. The I/O device(s) 208 may include one or more keyboards 210(1), touch sensors 210(2), and other devices 210(N) such as displays, haptic output devices, audio controllers, and so forth. As illustrated here, the I/O devices 208 are coupled to the asynchronous interfaces 206(1)-(A). All of the asynchronous interfaces 206 are thus in use, and unavailable for connecting to other devices, such as the second device 104.

The first device 102 may include one or more displays configured to provide visual output to a user. The one or more displays may comprise an electrophoretic or cholesteric material and may be configured to present an image using reflected light, ambient light, light from a front light, and so forth. A graphics controller driving this display may be coupled to the asynchronous interfaces 206 in some implementations.

The first device 102 may also include one or more network interfaces 212 configured to provide communications between the first device 102 and other devices. Such network interface(s) 212 may be used to connect to one or more personal area networks ("PAN"), local area networks ("LAN"), wide area networks ("WAN"), and so forth. For example, the network interfaces 212 may include radio modules for a Wi-Fi, LAN, and a Bluetooth PAN. In some implementations, these network interfaces 212 may be coupled to the one or more processors 202 using the asynchronous interfaces 206.

The first device 102 may also include one or more busses or other internal communications hardware or software that allow for the transfer of data between the various modules and components of the first device 102.

As shown in FIG. 2, the first device 102 includes one or more memories 214. The memory 214 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 214 provides storage of computer readable instructions, data structures, program modules, and other data for the operation of the first device 102.

The memory 214 may include at least one operating system (OS) module 216. The OS module 216 is configured to manage hardware resources such as the I/O interfaces 204 and provide various services to application modules 106 or modules executing on the processors 202. Also stored in the memory 214 may be one or more of the application modules 106, the communication module 108, and other modules 218.

As described above, the communication module 108 is configured to distribute traffic between the synchronous interfaces 114. For example, the communication module 108(1) may route the data out 112(1) as generated by the application module 106(1) for transmission on the synchronous interface 114(2) to reach the second device 104.

Other modules 218 may be stored in the memory 214. For example, a rendering module may be configured to process e-book files for presentation on the display. Yet another one of the other modules 218 may include a user interface module configured to provide a user interface to the user. This user interface may be visual, audible, haptic, or a combination thereof. For example, the user interface module may be configured to present an image on the display, such as the rendered e-book file.

The memory 214 may also include a datastore 220 to store information. The datastore 220 may use a flat file, database, linked list, tree, or other data structure to store the information. In some implementations, the datastore 220 or a portion of the datastore 220 may be distributed across one or more other devices including servers, network attached storage devices, and so forth.

The datastore 220 may store information about communication configurations, user preferences, and so forth. Other data may be stored in the datastore 220 such as e-books, video content, and so forth.

While processors 202 and memory 214 are depicted here, it is understood that synchronous interfaces 114 and the communication module 108 may be used in other devices which lack these or other elements. For example, the first device 102 may lack the network interfaces 212.

The second device 104 and other devices which may couple to the first device 102 or the second device 104 may be similar or the same in arrangement as described above.

Figure 3:
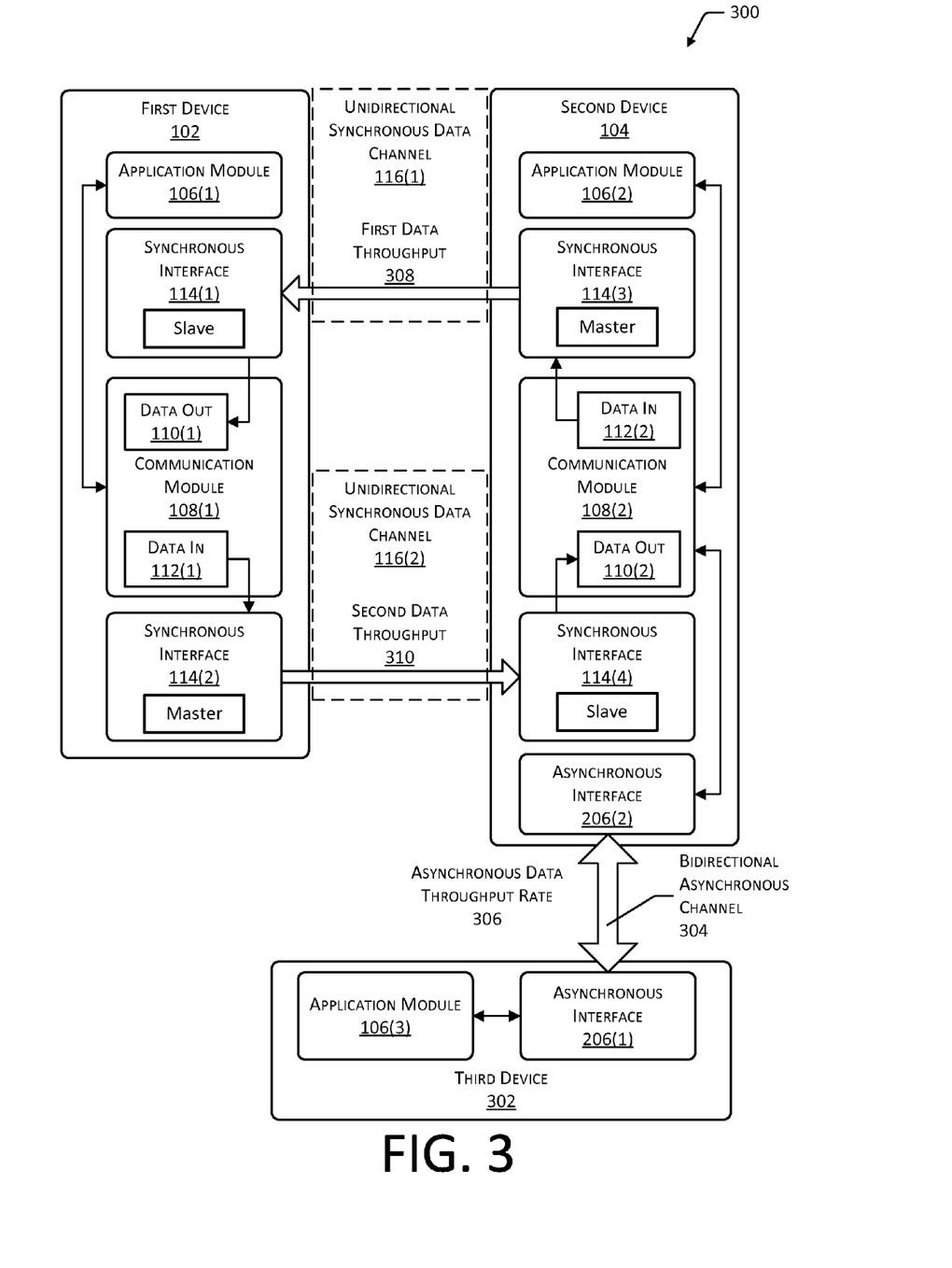
FIG. 3 is an illustrative system showing the second device acting as an adapter between the bidirectional communication using the pair of unidirectional synchronous data channels and an asynchronous interface on a third device.

FIG. 3 is an illustrative system 300 showing the second device 104 acting as an adapter. In one implementation, it may be useful to connect an existing device, such as a third device 302, with the first device 102 to allow exchange of information between the first device 102 and the third device 302.

As depicted here, the second device 104 may be configured to act as an adapter or converter. The third device 302 may include an asynchronous interface 206(1) while the second device 104 may include an asynchronous interface 206(2). Connection of these two asynchronous interfaces 206(1) and 206(2) establishes a bidirectional asynchronous channel 304 to be exchanged between the second device 104 and the third device 302. An asynchronous data throughput rate 306 describes how much data per unit of time may be transferred between the asynchronous interfaces 206. For example, the asynchronous data throughput rate 306 may be 115,000 bits per second ("bps").

As depicted above, the first unidirectional synchronous data channel 116(1) is depicted, configured to transfer data from the second device 104 to the first device 102. The second unidirectional synchronous data channel 116(2) is also depicted, configured to transfer data from the first device 102 to the second device 104. The first unidirectional synchronous data channel 116(1) may have a first data throughput 308. The first data throughput 308 describes how much data per unit of time may be transferred from the master synchronous interface 114(3) to the slave synchronous interface 114(1). For example, the first data throughput rate 308 may be 48,000 bps.

Similarly, the second unidirectional synchronous data channel 116(2) may have a second data throughput 310. The second data throughput 310 describes how much data per unit of time may be transferred from the master synchronous interface 114(2) to the slave synchronous interface 114(4). For example, the second data throughput rate 310 may be 64,000 bps.

The first data throughput 308 and the second data throughput 310 may be the same or may differ from one another. The first data throughput 308 and the second data throughput 310 may be configured such that they are individually or in aggregate less than the asynchronous data throughput 306. This may be done to prevent data overruns at the asynchronous interfaces 206, such as when the synchronous interface 114(4) sends data too fast for the asynchronous interface 206(2) to pass along to the asynchronous interface 206(1) of the third device 302.

Using the implementation described here in FIG. 3, the third device 302, such as a piece of test equipment with an existing RS-232 port, may continue to be used to test devices, such as the first device 102, which do not have an available asynchronous interface 206 for direct coupling. This allows ongoing use of existing infrastructure for test, repair, debugging, and so forth.

Figure 4:
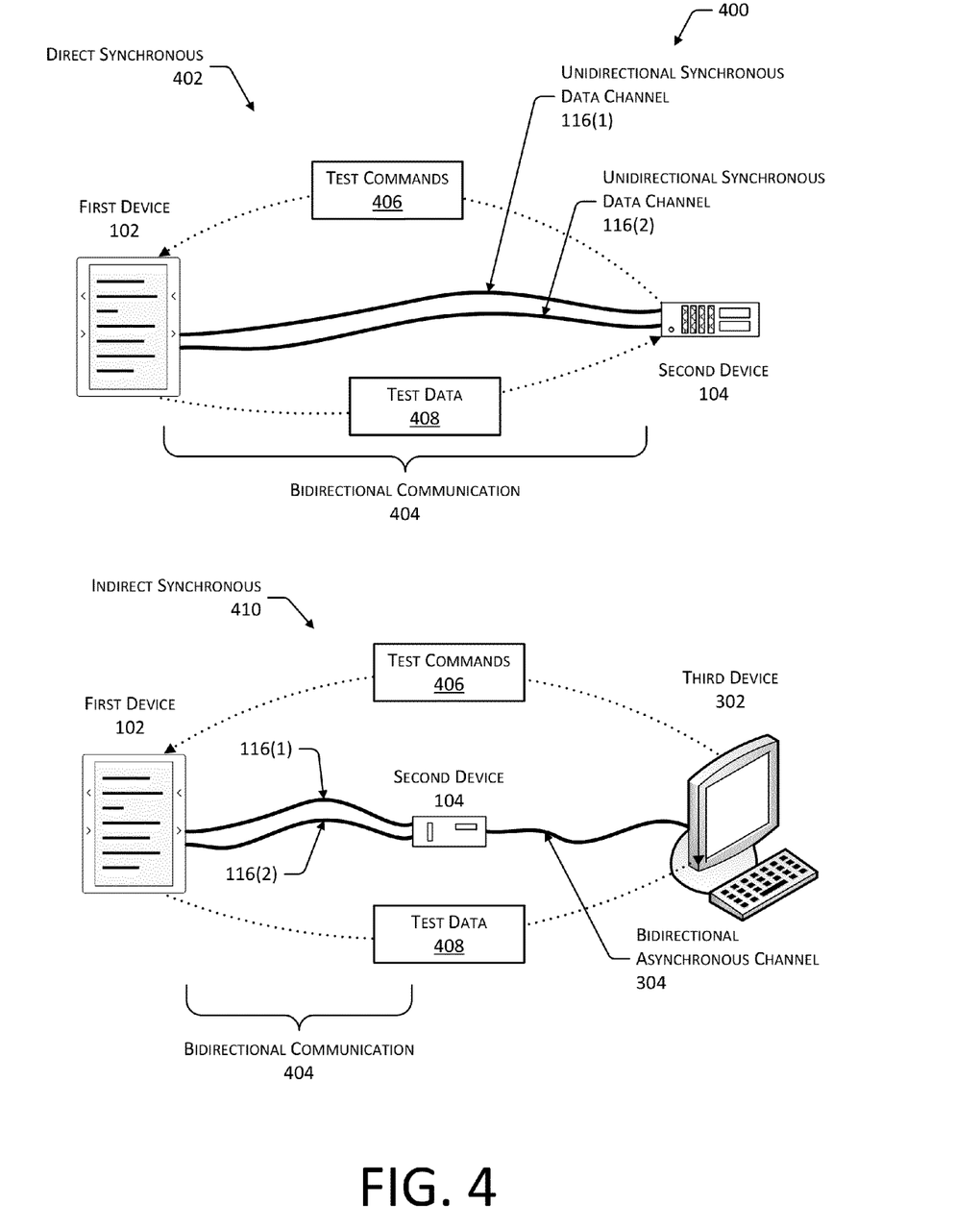
FIG. 4 illustrates a system with the first, second, and third devices.

FIG. 4 illustrates a system 400 with the first device 102, the second device 104, and the third device 302 in two different connection configurations. A direct synchronous connection 402 configuration is illustrated between the first device 102 and the second device 104. As described above with regard to FIG. 1, at least two unidirectional synchronous data channels 116(1) and 116(2) provide a first communication channel and a second communication channel, establishing bidirectional communication 404.

Information such as one or more instructions comprising test commands 406 may be sent from the second device 104 to the first device 102 using the bidirectional communication 404. For example, the second device 104 may comprise a test fixture configured to perform various tests on the first device 102. Once connected, the test commands 406 associated with the various tests may be sent. The first device 102 may then generate, at least partly in response to the test commands 406, test data 408. The test data 408 may then be transferred to the second device 104. The second device 104 may then process the test data 408 to ascertain one or more characteristics about the first device 102, such as whether it passes the test.

As described above, in some situations, the third device 302, such as a piece of test equipment, may not be equipped with two or more synchronous interfaces 114 available for connectivity. Alternatively, the third device 302 and associated test modules may be configured to use a particular asynchronous interface 206, such as a particular RS-232 port.

An indirect synchronous connection 410 configuration is depicted which may be used to address these situations. In this illustration, the second device 104 may act as an adapter between the synchronous interfaces 114 of the first device 102, which are available for use, and the asynchronous interface 206(1) of the third device 302.

As shown here, the two unidirectional synchronous data channels 116(1) and (2) connect the first device 102 and the second device 104, establishing bidirectional communication 404. The second device 104 provides the functionality as described above with respect to FIG. 3, and couples the synchronous interfaces 114(3) and 114(4) to the asynchronous interface 206(2). The bidirectional asynchronous channel 304 is illustrated between the second device 104 and the third device 302.

Data such as the test commands 406 and the test data 408 may thus be exchanged between the third device 302 and the first device 102. In other implementations, the second device 104 may adapt the bidirectional communication 404 to other formats or interfaces. For example, the second device 104 may implement a universal serial bus ("USB") interface, Ethernet interface, and so forth, for connectivity between the second device 104 and the third device 302.

Figure 5:
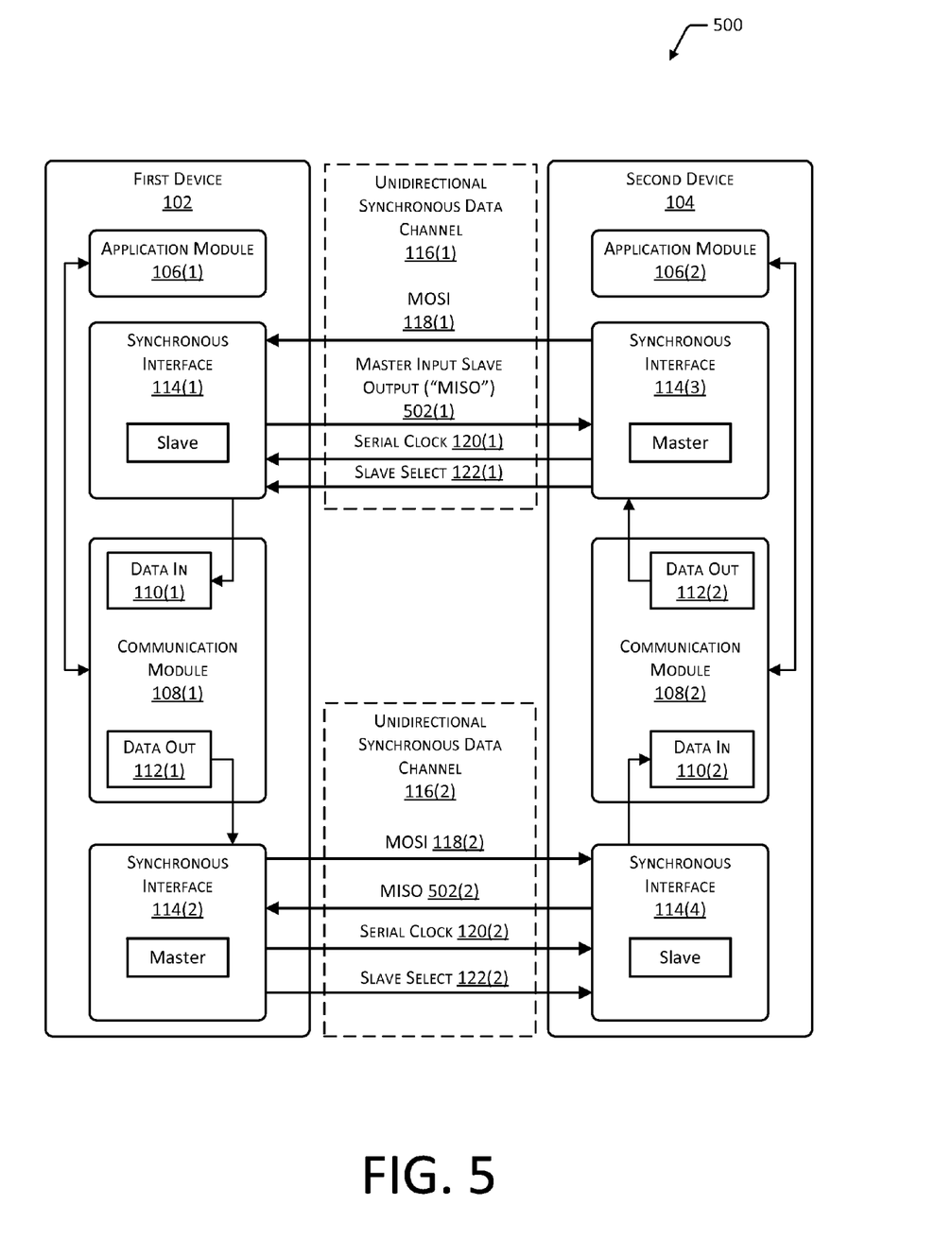
FIG. 5 illustrates an alternative system showing the first device and the second device.

FIG. 5 illustrates an alternative system 500 showing the first device 102 and the second device 104 coupled to one another using a pair of unidirectional synchronous data channels 116(1) and 116(2). While a pair of unidirectional synchronous data channels 116 are depicted, in some implementations, additional unidirectional synchronous data channels 116 may be provided. For example, two synchronous interfaces 114(1) and 114(5) (not depicted) may be configured on the first device 102 in the slave mode, to provide increased bandwidth or different communication channels.

In the system 500, an additional line is present between the pairs of synchronous interfaces 114. A master input/slave output ("MISO") line 502 is depicted. For example, the unidirectional synchronous data channel 116(1) may include the lines 118(1), 120(1), 122(1), and the MISO 502(1) line. Similarly, the lines 118(2), 120(2), 122(2), and 502(2) are used to provide the unidirectional synchronous data channel 116(2) to send data out 112 from the first device 102 to the second device 104. In some implementations, the MISO lines 502 may be disregarded during operation.

Illustrative Processes

Figure 6:
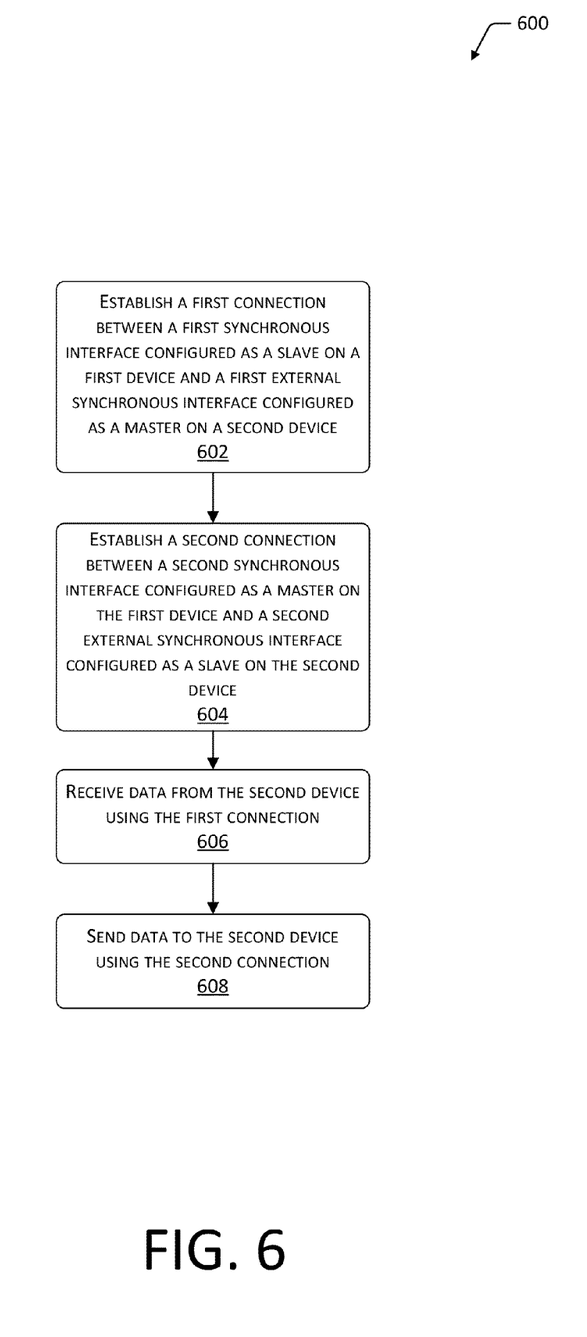
FIG. 6 is a flow diagram of a process of bidirectional communication using a pair of unidirectional synchronous data channels.

FIG. 6 is a flow diagram 600 of a process of bidirectional communication using the pair of unidirectional synchronous data channels 116(1) and 116(2). As described above, in some implementations, additional unidirectional synchronous data channels 116 may be used. The systems 100, 300, and 500 described above may be used to implement this process.

Block 602 establishes a first connection between a first internal synchronous interface 114(1) configured as a slave, such as on the first device 102, and a first external synchronous interface 114(3) configured as a master on an external device, such as the second device 104. For example, the first connection may comprise the unidirectional synchronous data channel 116(1).

Establishment of the connection may include coupling of electrical connectors corresponding to the first internal synchronous interface 114(1) and the second internal synchronous interface 114(2) to the corresponding first external synchronous interface 114(3) and the second external synchronous interface 114(4) of the external device. For example, a cable comprising copper wiring may provide the coupling. In other implementations, optical, radio frequency, magnetic, or acoustic couplings may be used.

Block 604 establishes a second connection between a second internal synchronous interface 114(2) configured as a master, such as on the first device 102, and a second external synchronous interface 114(4) configured as a slave on the external device, such as the second device 104. For example, the second connection may comprise the unidirectional synchronous data channel 116(2).

In some implementations, communication lines which are unused between the synchronous interfaces 114 may be omitted. In one such implementation, the first internal synchronous interface 114(1) may consist of a serial peripheral interface configured to receive the MOSI or slave input line 118(1), the serial clock line 120(1), and the slave select line 122(1). Likewise, the second internal synchronous interface 114(2) may consist of a serial peripheral interface configured to originate a MOSI or master output line 118(2), the serial clock line 120(2), and the slave select line 122(2).

The MISO line 502(2) as illustrated in FIG. 5 may thus be omitted when unused for operation of the unidirectional synchronous data channel 116. Omission of this line may include providing cabling which lacks a conductor assigned to the line. For example, a cable between the first device 102 and the second device 104 may have only the six lines depicted in FIG. 1.

As described above, the second internal synchronous interface 114(2) may be configured to generate one or more data signals for transmission without acknowledgement from the first external synchronous interface 114(4). The other pair(s) of synchronous communication interfaces 114 may also be configured similarly. Such configuration allows for the first device 102 and the second device 104 to be connected and disconnected without adverse effects. For example, transmission with acknowledgement would result in transmission errors being generated when the devices are disconnected. These transmission errors may result in errors in the application module 106, the OS module 216, and so forth. By using interfaces and protocols without acknowledgements, these errors may be avoided.

In one implementation, the MISO 502 line may be used to provide flow control or status information. For example, the synchronous interface 114 in a slave mode may be configured to send information flow control data indicating to slow down or speed up data transmission. In implementations where the synchronous interface 114 provides, the MISO 502 line may be repurposed to provide flow control, a general interrupt or attention line, and so forth.

Block 606 receives data from the external device, such as the second device 104, using the first connection. Block 608 sends data to the external device, such as the second device 104, using the second connection. Thus, bidirectional communication is established which is configured to transfer data at irregular intervals without using asynchronous interfaces 206 of the first device 102.

As described above with regard to FIG. 4, the data received from the external device may be test commands 406 comprising one or more instructions configured to perform one or more tests on the first device 102. The data sent to the external device, such as the second device 104, may comprise information or test data 408 associated with performance of the one or more tests. For example, the test commands 406 may instruct the first device 102 to run a memory check, and the test data 408 may comprise the results of that test.

This process may be used to establish communication between devices. In some implementations, these devices are separate, such as the first device 102 and the second device 104. In other implementations, the devices may be components or sub-systems within a same device, such as between a first system-on-a-chip ("SoC") and a second SoC. In another implementation, the process may be used to establish communication with other components such as a field-programmable gate array ("FPGA"), application specific integrated circuit ("ASIC"), backplane, and so forth.

Figure 7:
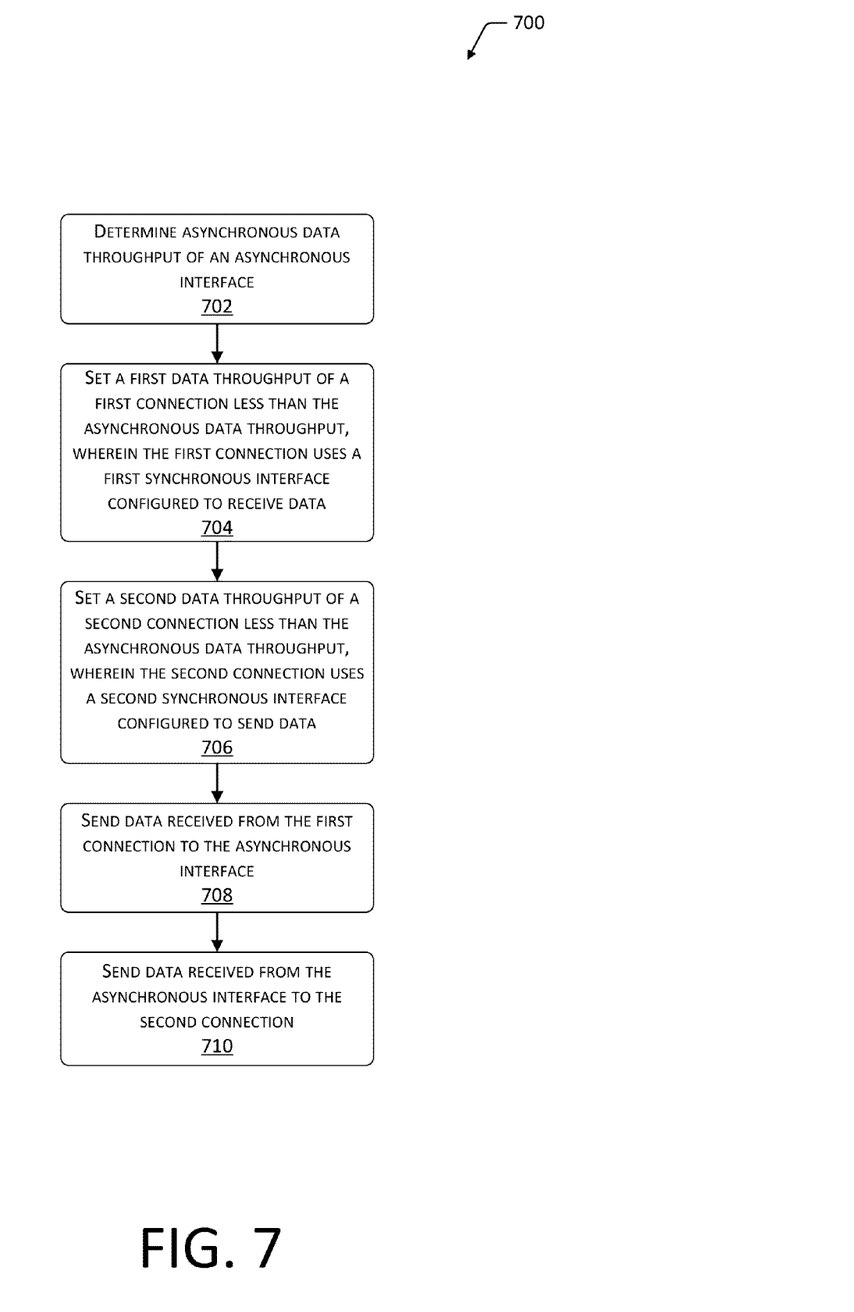
FIG. 7 is a flow diagram of a process of configuring data throughput of the unidirectional synchronous data channels relative to the data throughput of an asynchronous interface.

FIG. 7 is a flow diagram 700 of a process of configuring data throughput of the unidirectional synchronous data channels 116 relative to the data throughput of the asynchronous interface 206. As described above, this may be done to prevent data overruns at the asynchronous interfaces 206. For example, the synchronous interface 114(4) may send data too fast for the asynchronous interface 206(2) to pass along to the asynchronous interface 206(1) of the third device 302, as described above with respect to FIG. 3.

Block 702 determines the asynchronous data throughput 306 of the asynchronous interface 206 associated with the external device, such as the asynchronous interface 206(2) of the second device 104. As described above with respect to FIG. 3, the asynchronous interface 206(2) may be coupled to the first external synchronous interface 114(3) and the second external synchronous interface 114(4) of the second device 104.

Block 704 sets the first data throughput 308 of the first connection, such as the unidirectional synchronous data channel 116(1), to less than the asynchronous data throughput 306.

Block 706 sets the second data throughput 310 of the second connection, such as the unidirectional synchronous data channel 116(2), to less than the asynchronous data throughput 306.

Blocks 704 and 706 may set the first data throughput 308 and the second data throughput 310 independently or in aggregate. For example, where the asynchronous data throughput 306 is 115,000 bps, the first data throughput 308 and the second data throughput 310 may each be set to rates less than 115,000 bps, independent of one another, such as 114,000 bps. In another example, the aggregate or sum of the first data throughput 308 and the second data throughput 310 may be, in total, less than 115,000 bps.

Block 708 may then send data received from the first connection, such as the unidirectional synchronous data channel 116(1), to the asynchronous interface 206(2).

Block 710 may then send data received from the asynchronous interface 206(2) to the second connection, such as the unidirectional synchronous data channel 116(2).

Those having ordinary skill in the art will readily recognize that certain components, steps, or operations illustrated in the figures above can be eliminated, taken in an alternate order, or otherwise rearranged. Moreover, the methods described above may be implemented as one or more software programs for a computer system and are encoded in a computer-readable storage medium as instructions executable on one or more processors.

The computer-readable storage medium can be any one of an electronic storage medium, a magnetic storage medium, an optical storage medium, a quantum storage medium, and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A device comprising:
  a first synchronous serial peripheral interface configured in a slave mode to receive a slave input line, a serial clock line, and a slave select line;
  a second synchronous serial peripheral interface configured in a master mode to originate a master output line, a serial clock line, and a slave select line;
  at least one memory storing computer-executable instructions; and
  at least one processor configured to couple to the at least one memory, to the first and second synchronous serial peripheral interfaces, and further configured to execute the computer-executable instructions to:
    establish a first communication channel to an external device with the first synchronous serial peripheral interface;
    establish a second communication channel to the external device with the second synchronous serial peripheral interface;
    receive incoming data from the first synchronous serial peripheral interface; and
    send output data to the second synchronous serial peripheral interface.

2. The device of claim 1, wherein the incoming data comprises one or more instructions configured to test at least a portion of the device; and wherein the output data comprises data responsive to the test.

3. The device of claim 1, wherein the first synchronous serial peripheral interface is configured to be a single slave device to an external master device, and further wherein the second synchronous serial peripheral interface is configured to be a single master device to an external slave device.

4. The device of claim 1, wherein the master mode is configured to send clock signals on the serial clock line and to initiate a first set of one or more data frames on the master output line, and further wherein the slave mode is configured to receive clock signals on the serial clock line and receive a second set of one or more data frames on the slave input line.

5. A system comprising:
  a first internal synchronous interface configured to couple to a first external synchronous interface;
  a second internal synchronous interface configured to couple to a second external synchronous interface;

a controller coupled to the first internal synchronous interface and the second internal synchronous interface and configured to:
open a first unidirectional synchronous data channel for incoming data with the first internal synchronous interface; and
open a second unidirectional synchronous data channel for outgoing data with the second internal synchronous interface.

6. The system of claim 5, wherein the first and the second internal synchronous interfaces comprise serial peripheral interfaces.

7. The system of claim 5, wherein the first internal synchronous interface and the first external synchronous interface both comprise a first type of interface; and further wherein the second internal synchronous interface and the second external synchronous interface both comprise a second type of interface different from the first type of interface.

8. The system of claim 7, wherein the first type of interface or the second type of interface may comprise a serial peripheral interface or an inter-integrated circuit interface.

9. The system of claim 5, wherein the first external synchronous interface and the second external synchronous interface are arranged in an external device.

10. The system of claim 5, wherein the controller is further configured to route the outgoing data to the second internal synchronous interface for transmission using the second unidirectional synchronous data channel.

11. The system of claim 5, wherein the opening of the first unidirectional synchronous data channel and the second unidirectional synchronous data channel comprises initializing the first or the second internal synchronous data interface for communication.

12. The system of claim 5, wherein the first and the second unidirectional synchronous data channels are each configured to transfer one or more data frames in a single direction during operation.

13. The system of claim 5, further comprising:
at least one memory storing computer-executable instructions; and
at least one processor configured to couple to the memory, the controller, and further configured to execute the computer-executable instructions to:
determine one or more commands present in the incoming data received on the first unidirectional synchronous data channel;
perform the one or more commands;
generate output based at least in part on the performance of the one or more commands; and
send the output using the second unidirectional synchronous data channel.

14. The system of claim 5, wherein the first internal synchronous interface is further configured to operate in a slave mode receiving one or more data frames; and further wherein the second internal synchronous interface is configured to operate in a master mode sending one or more data frames.

15. A method comprising:
establishing a first connection between a first internal synchronous interface configured as a slave and a first external synchronous interface configured as a master on an external device;
establishing a second connection between a second internal synchronous interface configured as a master and a second external synchronous interface configured as a slave on the external device;
receiving data from the external device using the first connection; and
sending data to the external device using the second connection.

16. The method of claim 15, wherein the first internal synchronous interface consists of a serial peripheral interface configured to receive a slave input line, a serial clock line, and a slave select line; and further wherein the second internal synchronous interface consists of a serial peripheral interface configured to originate a master output line, a serial clock line, and a slave select line.

17. The method of claim 15, wherein the establishing comprises coupling of electrical connectors corresponding to the first internal synchronous interface and the second internal synchronous interface to the corresponding first external synchronous interface and the second external synchronous interface of the external device.

18. The method of claim 15, wherein the data received from the external device comprises one or more instructions configured to perform one or more tests, and wherein the data sent to the external device comprises information associated with performance of the one or more tests.

19. The method of claim 15, wherein the second synchronous interface is configured to generate one or more data signals for transmission without acknowledgement from the first external synchronous interface.

20. The method of claim 15, further comprising:
determining an asynchronous data throughput of an asynchronous interface associated with the external device, wherein the asynchronous interface is coupled to the first external synchronous interface and the second external synchronous interface;
setting a first data throughput of the first connection to less than the asynchronous data throughput; and
setting a second data throughput of the second connection to less than the asynchronous data throughput.

* * * * *